May 1, 1934.　　　A. O. HOLTOM　　　1,956,616
CONVERTIBLE BODY
Filed June 22, 1932　　　5 Sheets-Sheet 1
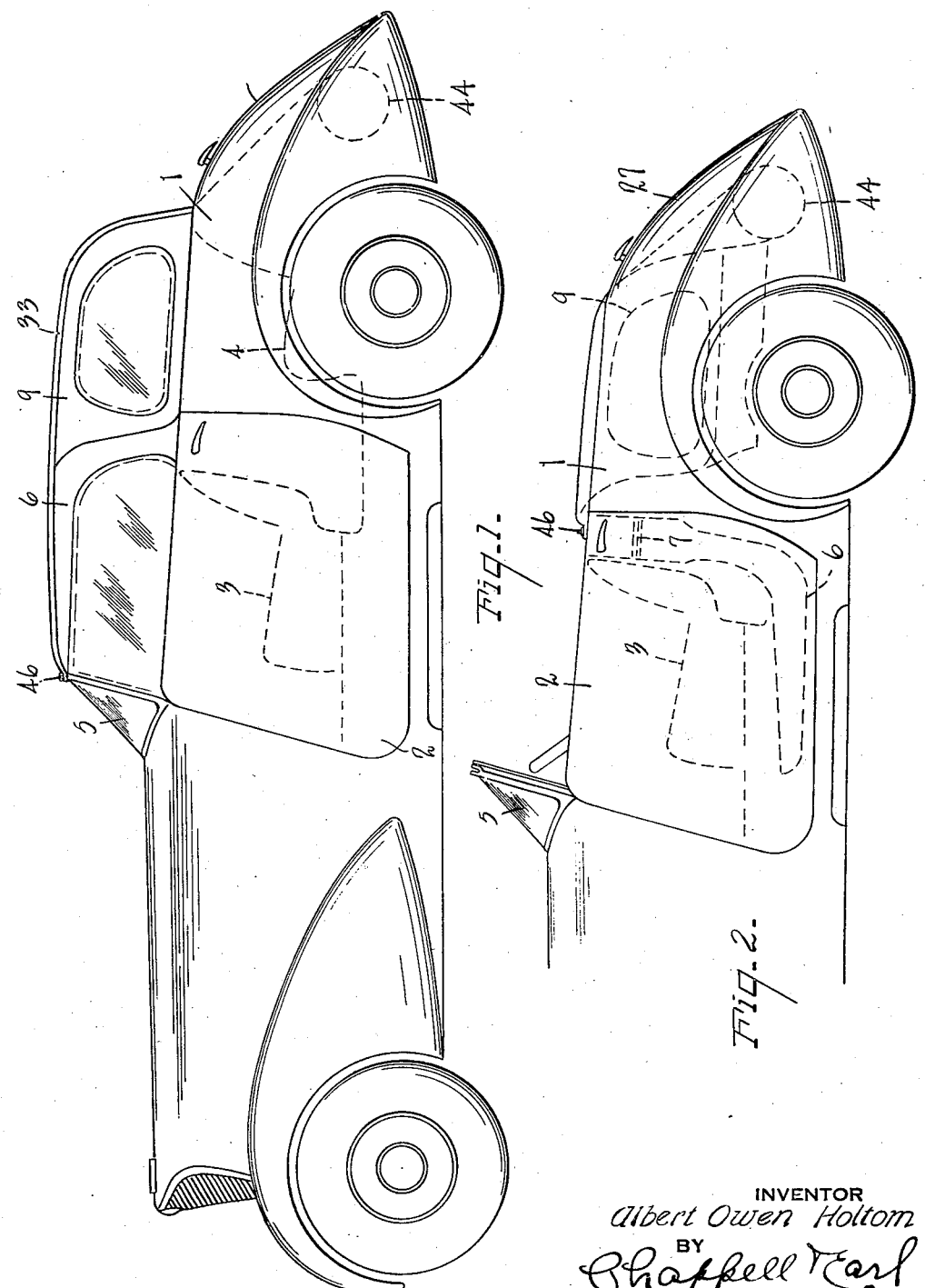
INVENTOR
Albert Owen Holtom
BY
Chappell Earl
ATTORNEYS

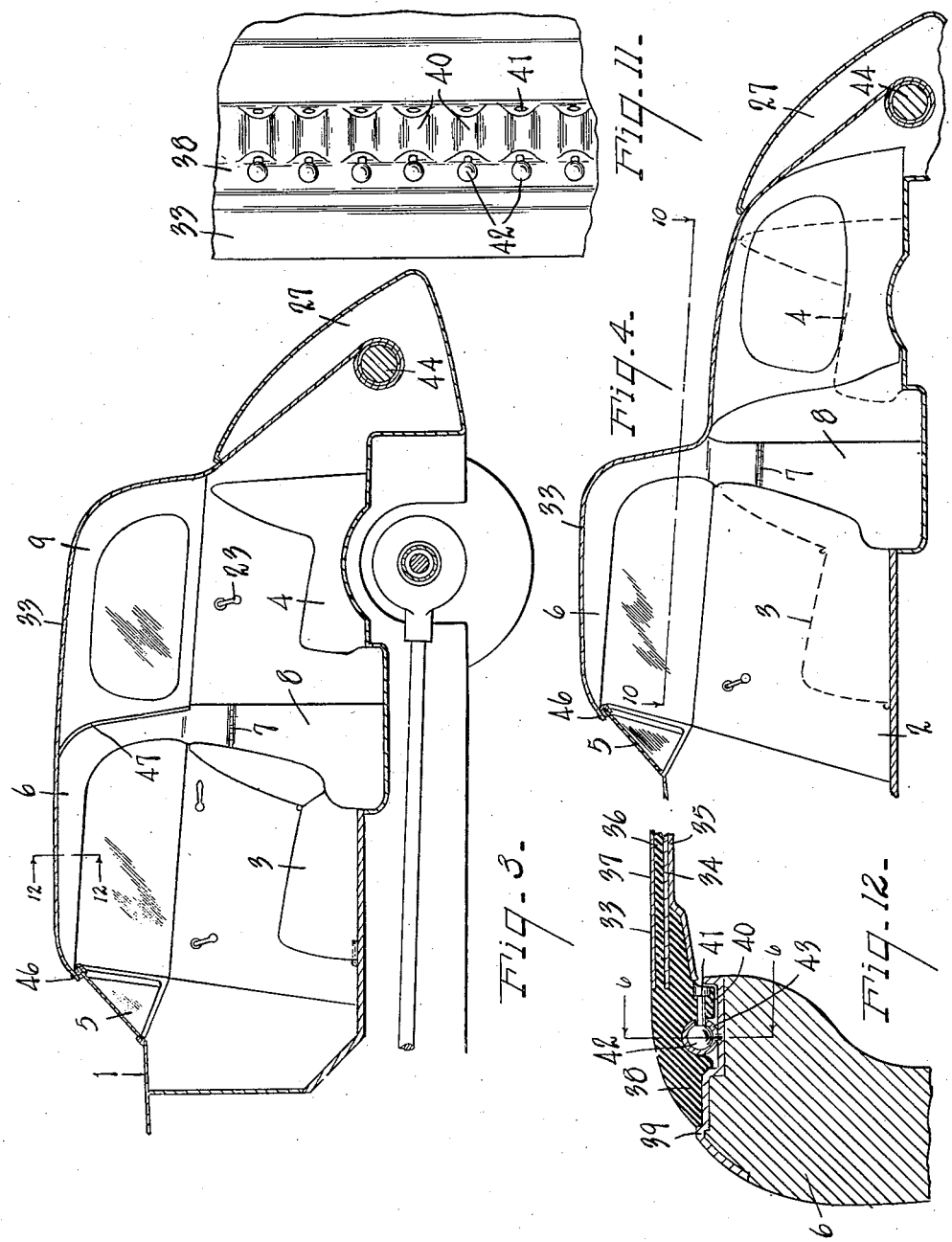

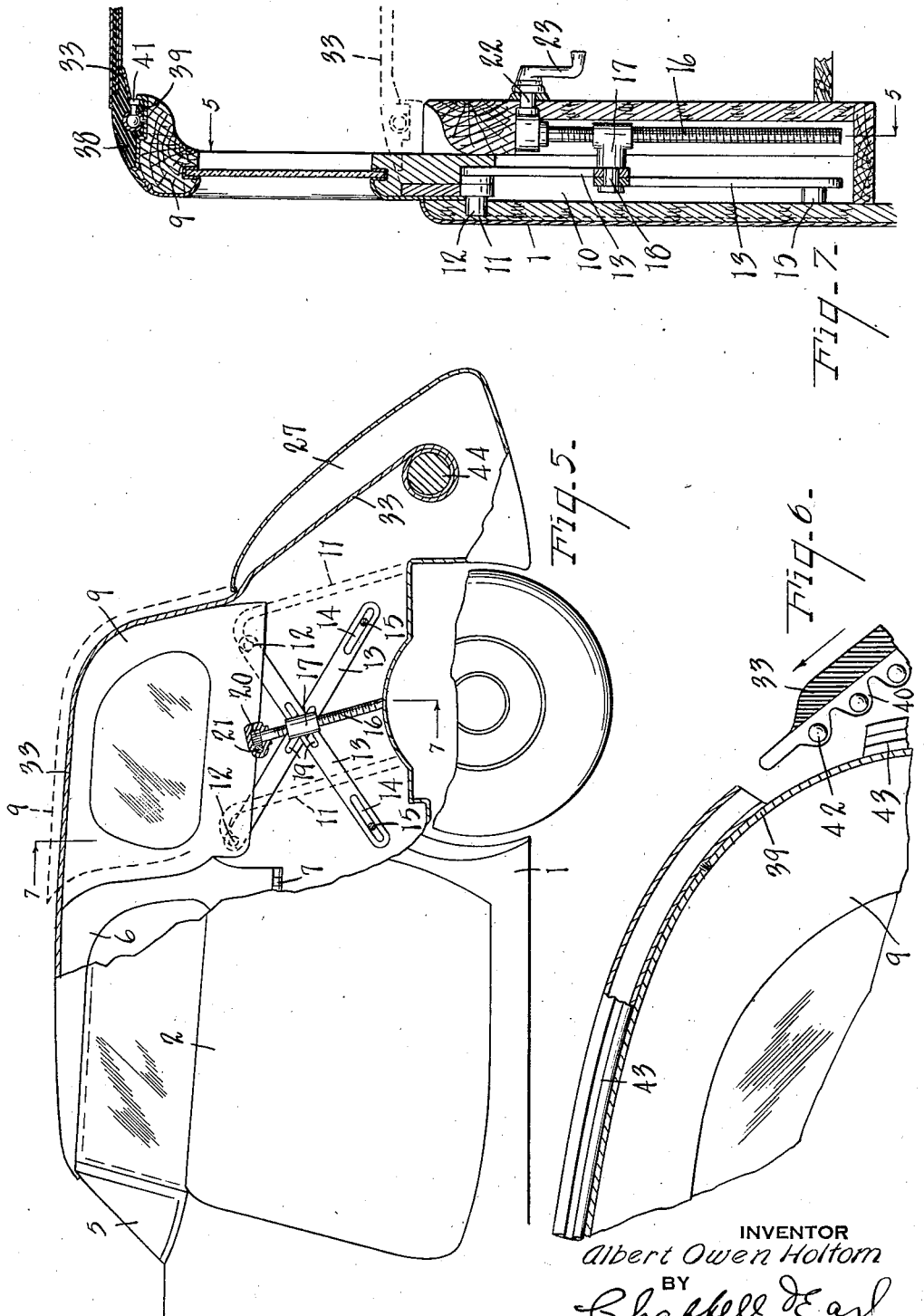

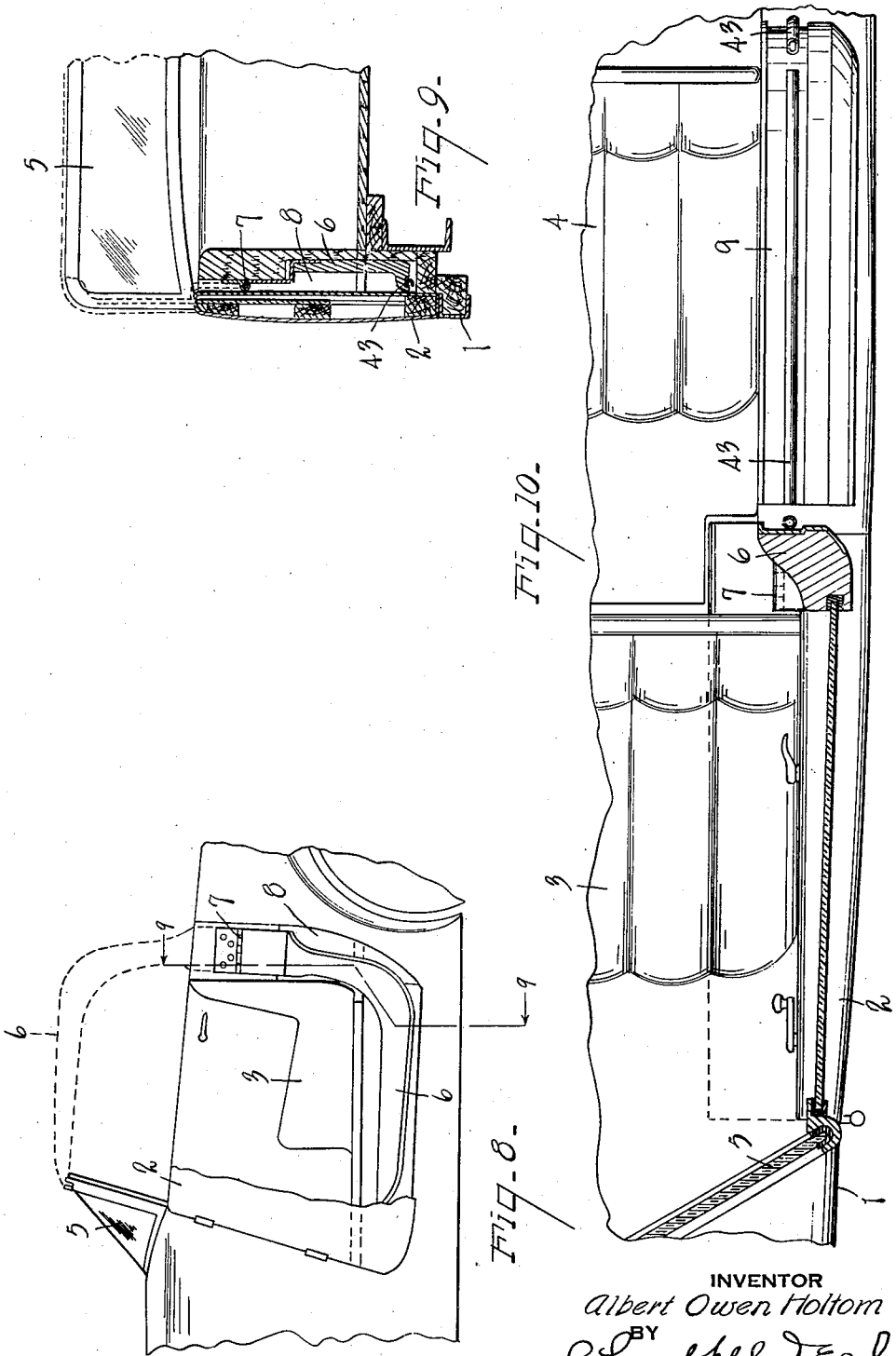

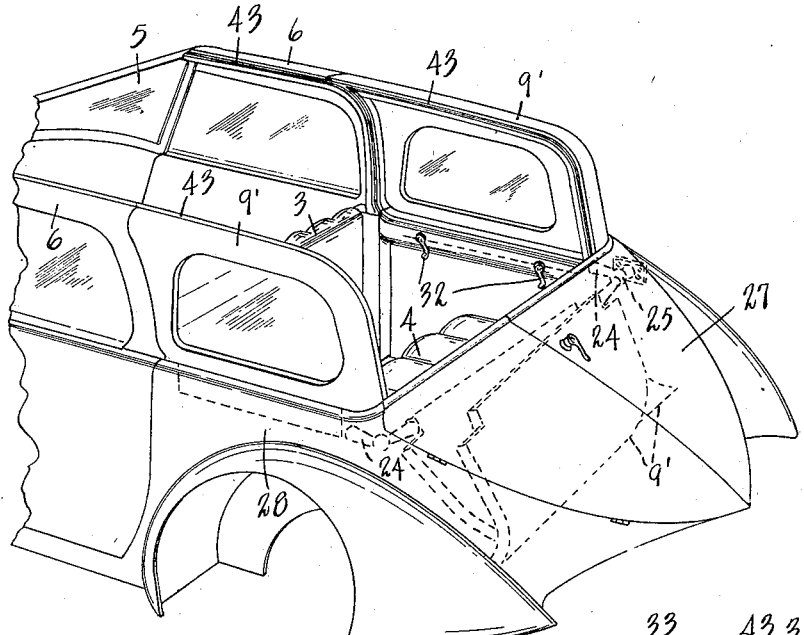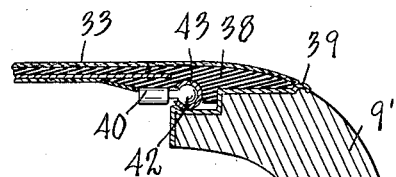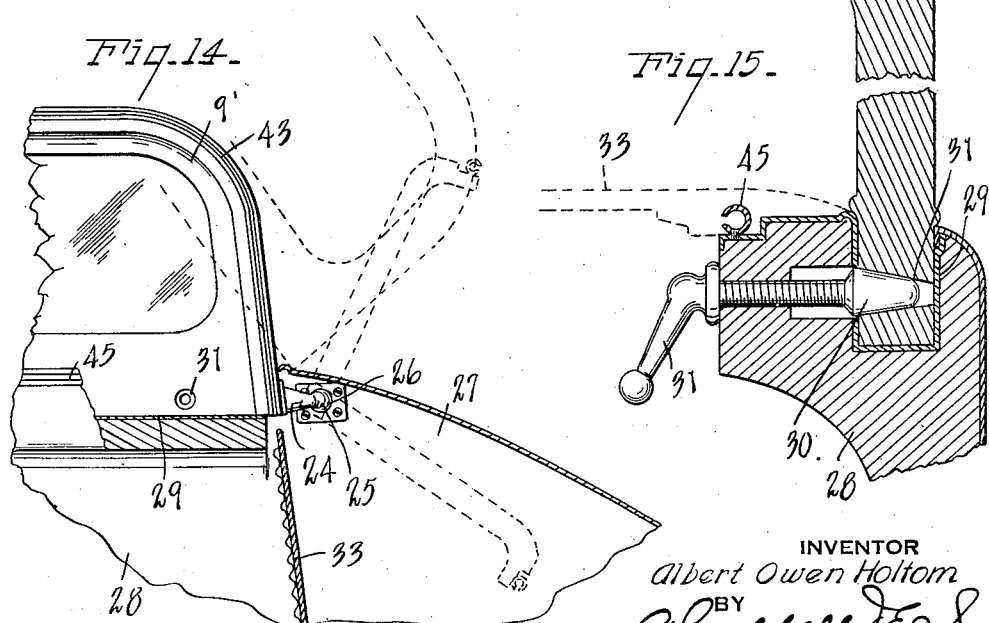

Patented May 1, 1934

1,956,616

UNITED STATES PATENT OFFICE 1,956,616

CONVERTIBLE BODY

Albert Owen Holtom, New York, N. Y.

Application June 22, 1932, Serial No. 618,645

19 Claims. (Cl. 296—107)

This invention relates to improvements in convertible vehicle bodies in which a flexible roof or top is employed in conjunction with collapsible side members. It also relates in part to all types of convertibles using soft roof construction.

The main objects of this invention are:

First, to provide a convertible body which may be readily converted from an open vehicle of either touring or roadster types to a closed body of the sedan type or a closed body of the coupe type or to a Victoria.

Second, to provide a convertible vehicle body which lends itself to rapid and easy manipulation (including flexible roof) to any of its several forms, being at the same time waterproof, free from rattles, and not wearing abnormally.

Third, to provide a convertible vehicle body which will lend itself to modern stream line construction in any of its several forms.

Fourth, to provide a convertible vehicle body construction which is sufficiently flexible in design to adapt itself to the variable requirements of chassis details common to the industry and at the same time in a form that lends itself to economical production.

Fifth, to provide a convertible vehicle body which is neat and attractive in appearance, which is very quickly and easily converted from one form to another, and which is simple and economical in its parts.

Sixth, to provide an improved convertible vehicle body having a superior top rail side panel structure.

Objects relating to details and economies of my invention will appear from the description to follow. The invention is defined and pointed out in the claims.

A structure which is a preferred embodiment of my invention is illustrated in the accompanying drawings, in which:

Fig. 1 is a side elevation of an automobile embodying the features of my invention arranged as a coach.

Fig. 2 is a fragmentary side elevation showing the parts arranged as a roadster.

Fig. 3 is a fragmentary longitudinal vertical section with the parts arranged as in Fig. 1.

Fig. 4 is a fragmentary longitudinal vertical section showing the parts arranged to form a coupe.

Fig. 5 is a fragmentary side elevation partially broken away and shown in vertical section on a line corresponding to line 5—5 of Fig. 7.

Fig. 6 is an enlarged fragmentary detail section on line 6—6 of Fig. 12.

Fig. 7 is an enlarged fragmentary transverse vertical section on a line corresponding to line 7—7 of Fig. 5.

Fig. 8 is a fragmentary side elevation showing the parts arranged to form a roadster, a portion of the door being broken away to show the frame housing.

Fig. 9 is a fragmentary transverse section on line 9—9 of Fig. 8.

Fig. 10 is an enlarged fragmentary horizontal section with the parts arranged to provide a roadster.

Fig. 11 is a fragmentary detail of the cover.

Fig. 12 is an enlarged fragmentary detail section on a line corresponding to line 12—12 of Fig. 3.

Fig. 13 is a fragmentary perspective view of a modification.

Fig. 14 is a fragmentary longitudinal vertical section thereof, the manipulation of the parts being illustrated by dotted lines.

Fig. 15 is an enlarged fragmentary transverse vertical section thereof.

In the embodiment of my invention illustrated in the accompanying drawings, 1 represents the body of the vehicle, 2 the doors, 3 the front or driver's seat, and 4 the rear seat. I have not illustrated the details of body and seat structures other than seems necessary to illustrate an adaptation of my invention. The windshield 5 in the embodiment illustrated is designed in keeping with the general design of the vehicle.

The top comprises a pair of L-shaped frame members 6 hinged at 7 so that they may be swung down at the sides of the seat, as shown in Fig. 8 where the frame members are shown in collapsed position by full lines and in erected position by dotted lines. The body has recesses 8 at each side, adapted to receive these top frame members so that the doors may be closed over the frame members when they are collapsed, the frame members swinging outwardly and upwardly to erect them and reversely to collapse them.

The rear side panels 9, suitably glazed, are adapted to be collapsed into chambers 10 provided therefor in the sides of the body. The collapsing movement of these side panels is guided by the parallel slots 11, the side panels having pins 12 slidably engaging these slots. The slots are forwardly inclined and terminate in upwardly curved offsets at their upper ends so that the final erecting movement of the panels is forwardly and downwardly, as indicated by dotted lines in Fig. 5. The forward edges of the panels are conformed to fit the rear edges of the frame members 6. The frame members 6, when erected, are secured to the windshield, the securing means not being detailed.

To facilitate the adjustment of the rear side panels 9, I provide a raising and lowering mechanism consisting of a pair of crossed links 13, the upper ends of which are connected to the pins 12. The links have longitudinal slots 14 at their lower ends, engaged with the pins 15. The adjusting screw 16 is provided with a nut 17 carrying a headed pin 18 engaging the central slots 19 located at the crossing point of the links. At its upper end, the screw is provided with a pinion 20 coacting with the worm gear 21 on the spindle 22 of the crank 23 arranged on the inside of the body.

Assuming that the side panels are in collapsed position, the crank is turned to rotate the screw in the proper direction to elevate the side members to the position shown in dotted lines in Fig. 5, in which position the pins 12 will be at the upper ends of the slots. The screw is then reversed, which allows the pins to move downwardly into the ends of the slots which serve as stops and rests therefor.

A modified mechanism or alternative mechanism for supporting the side panel is illustrated in Figs. 13 to 15, inclusive. In this embodiment, each side panel or rear quarter 9' is provided with a rearwardly projecting arm 24 terminating in a ball joint member 25 swiveled in the socket 26 attached to the inner wall of the rear hatch 27. In this embodiment, the side walls 28 are provided with grooves 29 in their upper edges adapted to receive the lower edges of the top panels 9', the side panels being locked in erected position by the tapered headed screws 30 which engage tapered sockets 31 in the panels. These screws are provided with hand pieces 32 by means of which they may be withdrawn to release the panels or advanced to lock them in position.

The collapsed position of these side panels within the hatch is illustrated by dotted lines in Fig. 13. The arms 24 and sockets 25 may be omitted, the side panels being entirely detached and arranged within the hatch if desired, as the locking means illustrated is very effective in securing the parts in erected position. Each method of supporting the rear quarter or side panels has its advantage in certain types of chassis.

The roof or cover 33 is preferably of laminated construction, consisting of an intermediate sheet 34 of strong flexible material such as a flat or corrugated sheet of steel, celluloid, fiber, or the like. To the inner side of this sheet, I secure a lining 35 and on its upper side a layer 36 of composition such as cork or other suitable sound deadening substance, above which is a layer 37 of waterproof fabric or rubber compound. A rubber molding 38 is provided for each edge of the top. This conforms to the outline of metal molding 39 on the upper edges of the side panels and the frame members 6.

The cover molding 38 has ribs 40 on its under side in which are embedded a series of pins 41 having spherical heads 42 slidably engageable in the channels 43 mounted on the moldings. These channels are in the form of tubes having inwardly facing slots adapted to receive the pins. The heads 42 are preferably rotatable on the pins to reduce friction. The cover is provided with a roller 44 arranged in the hatch 27, the cover being easily rolled up if the rubber molding 38 thereof is properly compounded so as to be pliable.

The laminated cover described may be rolled without injury thereto.

In the modification shown in Figs. 3 to 15, it is necessary to provide the sides of the body with channels 45 adapted to receive the retaining pins of the cover when the side panels 9 are collapsed. When the vehicle is adjusted as a coach, the side frames and rear quarter panels are both erected and the cover pulled forwardly thereon and secured by suitable fasteners indicated at 46. When the body is adjusted as a coupe, the rear quarter panels are collapsed and the roof drawn forward with the pins engaging the channels 45, and then drawn over the arched side members 6 and secured in place. When the body is adjusted as a roadster, the rear quarter panels and the frame members 6 are collapsed and the roof drawn forwardly over the rear seat, as shown in Fig. 2.

Roofs, such as are known in European countries as "sunshine roofs" may be used, but I prefer the particular roof illustrated. Other means may be employed for holding the roof or top in place, a common method being snap buttons. Zipper fastenings have also been used for this purpose, but the structure I have illustrated and described is preferred by me.

The rear quarters preferably have a facing 47 of soft rubber which provides a gasket for the joint between these members and the front members 6, and also prevents rattling and squeaking.

My improved convertible body may be very quickly adjusted to the different types for which it is designed, and it is neat and attractive in appearance in any of its forms or adjustments. My improvements particularly lend themselves to embodiment in the more modern types of vehicle designs.

I have illustrated and described my invention in embodiments which I consider very desirable. I have not attempted to illustrate other embodiments and adaptations which might be desirable with particular designs or types of vehicles, as it is believed that this disclosure will enable those skilled in the art to embody or adapt my improvements as may be desired.

Having thus described my invention what I claim as new and desire to secure by Letters Patent is:

1. In a convertible vehicle body, the combination of sides having opposed door openings therein, and a seat arranged so that the ends of the seat are within the door openings, doors for said openings, said body having outwardly opening angled recesses at the rear of and below the seat, angled top frame members of L-shape, hinged to said body to swing outwardly and collapse wholly into said recesses, the body sides having panel storage chambers at the rear of said door openings, rear quarter panels collapsible into said recesses and having their front edges conformed to fit the rear edges of said top frames, said quarter panels and top frame members having inwardly facing channels on their upper edges, and a cover of flexible material having headed studs slidably engageable with said channels when they are in their erected and collapsed position.

2. In a convertible vehicle body, the combination of sides having opposed door openings therein, and a seat arranged so that the ends of the seat are within the door openings, doors for said openings, said body having outwardly opening angled recesses at the rear of and below the seat, angled top frame members of L-shape, hinged to said body to swing outwardly and collapse wholly into said recesses, the body sides having panel storage chambers at the rear of said door openings, rear quarter panels collapsible into said recesses and having their front edges conformed to fit the rear edges of said top frames, and a flexible cover engageable with said top frames and panels.

3. In a convertible vehicle body, the combination of sides having opposed door openings therein and a seat arranged so that the ends of the seat are within the door openings, doors for said openings, angled top frame members of L-shape, hinged to said body to swing outwardly and collapse at the ends of the seat, the body sides having panel storage chambers at the rear of said door opening, rear quarter panels collapsible into said recesses and having their front edges conformed to fit the rear edges cf said top frames, said quarter panels having inwardly facing channels on their upper edges, and a cover of flexible material having headed stubs slidably engageable with said channels when they are in their erected and collapsed position.

4. In a convertible vehicle body, the combination of sides having opposed door openings therein and a seat arranged so that the ends of the seat are within the door openings, doors for said openings, angled top frame members of L-shape, hinged to said body to swing outwardly and collapse at the ends of the seat, the body sides having panel storage chambers at the rear of said door openings, rear quarter panels collapsible into said recesses and having their front edges conformed to fit the rear edges of said top frames, and a flexible cover engageable with said top frames and panels.

5. In a convertible vehicle body, the combination of sides having opposed door openings therein and a seat arranged so that the ends of the seat are within the door openings, doors for said openings, said body having outwardly opening angled recesses at the rear of and below the seat, angled top members of L-shape, hinged to said body to swing outwardly and collapse into said recesses, collapsible rear quarter panels having their front edges conformed to fit the rear edges of said top frames, said quarter panels having inwardly facing channels on their upper edges, and a cover of flexible material having headed studs slidably engageable with said channels when they are in their erected and collapsed position.

6. In a convertible vehicle body, the combination of sides having opposed door openings therein and a seat arranged so that the ends of the seat are within the door openings, doors for said openings, said body having outwardly opening angled recesses at the rear of and below the seat, angled top members of L-shape, hinged to said body to swing outwardly and collapse into said recesses, collapsible rear quarter panels having their front edges conformed to fit the rear edges of said top frames, said quarter panels having inwardly facing channels on their upper edges, and a flexible cover engageable with said top frame and panels.

7. In a convertible vehicle body, the combination of sides having opposed door openings therein and a seat arranged so that the ends of the seat are within the door openings, doors for said openings, angled top members of L-shape, hinged to said body to swing outwardly and collapse at the ends of said seat, collapsible rear quarter panels having their front edges conformed to fit the rear edges of said top frames, said quarter panels having inwardly facing channels on their upper edges, and a cover of flexible material having headed studs slidably engageable with said channels when they are in their erected and collapsed position.

8. In a convertible vehicle body, the combination of sides having opposed door openings therein and a seat arranged so that the ends of the seat are within the door openings, doors for said openings, angled top members of L-shape, hinged to said body to swing outwardly and collapse at the ends of said seat, collapsible rear quarter panels having their front edges conformed to fit the rear edges of said top frames, and a flexible cover engageable with said top frames and panels.

9. In a convertible vehicle, the combination with sides having door openings therein, doors for said openings, a seat disposed in alinement with said door openings, collapsible top members mounted on said sides to swing outwardly and downwardly in collapsing, said body having recesses adapted to receive the whole of said top members, and doors for said door openings closing over said recesses.

10. In a convertible vehicle, the combination with sides having door openings therein, doors for said sides, a seat disposed in alinement with said door openings, collapsible top members mounted on said sides to swing downwardly and inwardly in collapsing, and doors for said door openings closing entirely over said frame members when collapsed.

11. A convertible vehicle body comprising frame-like top members of L-shape, hinged to the sides of the body to swing outwardly and downwardly, rear quarter panels collapsibly mounted for adjustment to clear the swinging front top members or to fit against the rear edges thereof, and a cover of flexible material adapted to be drawn over said rear quarter panels and said top members when they are both in erected position or over the front top member when the rear quarter panels are collapsed.

12. A convertible vehicle body comprising frame-like top members of L-shape, hinged to the sides of the body to swing outwardly and downwardly, collapsible rear quarter panels fitting against the rear edges of the top members, and a cover of flexible material adapted to be drawn over said rear quarters and said top members when they are both in erected position or over the front top member when the rear quarter panels are collapsed.

13. A convertible vehicle body comprising frame-like front top members of L-shape, hinged to the sides of the body to swing outwardly and downwardly to collapsed position, rear quarter panels adjustably mounted to be collapsed within the body or to an erected position with their forward edges fitting against the rear edges of said top frame members, and a cover of flexible material adapted to be drawn over said rear quarter and top members, said rear quarter and front top members being provided with moldings with which the flexible cover is slidably engaged.

14. A convertible vehicle body comprising frame-like front top members of L-shape, hinged to the sides of the body to swing outwardly and downwardly to collapsed position, rear quarter panels adjustably mounted to be collapsed within the body or to an erected position with their forward edges fitting against the rear edges of said top frame members, and a cover of flexible material adapted to be drawn over said rear quarter and top members.

15. In a convertible vehicle body, frame-like arches of L-shape, hinged to the sides of the body and adapted to swing outwardly, and a cover of flexible material adapted to be drawn over said arches.

16. In a convertible vehicle body, frame-like arches of L-shape, hinged to the sides of the body and adapted to swing outwardly, a cover of flexible material adapted to be drawn over said arches, and molding on said arches engaging the edges of the flexible cover in such a way as to preclude lifting or side movement of the cover.

17. In a convertible vehicle body, frame-like arches of L-shape, hinged to the sides of the body and adapted to swing outwardly, rear quarters adapted to be moved into or out of place, and a slidable cover of flexible construction adapted to be drawn over the rear compartment only, over the rear compartment and arches, over the rear quarters alone, and over rear quarters and arches to form any one of the various body types.

18. A convertible vehicle body provided with a door opening, a door closing said opening, an inverted substantially L-shaped arched top member hinged to said body and adapted only to swing outwardly, the body having a recess for receiving the top member located adjacent the inside of the door to conceal the top member, a side panel disposed back of said top member, and means for positioning said side panel adjacent said top member with a downwardly and forwardly inclined movement in its own vertical plane.

19. A convertible vehicle body provided with substantially L-shaped arched top members hinged to swing outwardly, side panels swiveled to the body at their lower rear corner for movement to erected position with a downwardly and forwardly inclined movement, and a roll top associated with said panels and top members.

ALBERT OWEN HOLTOM.